United States Patent
Jiang et al.

(10) Patent No.: US 9,473,954 B2
(45) Date of Patent: Oct. 18, 2016

(54) PERFORMANCE MONITOR, EVALUATION AND DIAGNOSIS SYSTEM FOR WIRELESS SENSOR NETWORKS

(71) Applicants: Jin Jiang, London (CA); Quan Wang, London (CA)

(72) Inventors: Jin Jiang, London (CA); Quan Wang, London (CA)

(*) Notice: Subject to any disclaimer, the term of this patent is extended or adjusted under 35 U.S.C. 154(b) by 122 days.

(21) Appl. No.: 13/915,105

(22) Filed: Jun. 11, 2013

(65) Prior Publication Data

US 2014/0362711 A1 Dec. 11, 2014

(51) Int. Cl.
*H04W 24/02* (2009.01)
*H04W 24/04* (2009.01)
*H04W 84/18* (2009.01)

(52) U.S. Cl.
CPC ............ *H04W 24/02* (2013.01); *H04W 24/04* (2013.01); *H04W 84/18* (2013.01)

(58) Field of Classification Search
CPC ... H04W 24/00; H04W 24/02; H04W 24/04; H04W 24/06; H04W 24/08; H04W 24/10; H04W 84/18; H04W 84/22; H04W 4/005; H04W 88/06
See application file for complete search history.

(56) References Cited

U.S. PATENT DOCUMENTS

| | | | |
|---|---|---|---|
| 8,031,650 B2* | 10/2011 | Petite et al. ........... | H04B 7/216 270/320 |
| 8,165,833 B2 | 4/2012 | Zalyubovskiy et al. | |
| 8,295,183 B2* | 10/2012 | Van Der Wateren ......... | 370/241 |
| 2008/0191893 A1* | 8/2008 | Li et al. ............... | H04W 8/005 340/686.6 |
| 2009/0285154 A1* | 11/2009 | Gesmundo et al. .......... | 370/316 |
| 2010/0082809 A1* | 4/2010 | Nakamura .................... | 709/224 |
| 2012/0026890 A1* | 2/2012 | Banka et al. ................. | 370/242 |
| 2013/0318188 A1* | 11/2013 | Liekens et al. ......... | H04L 41/00 709/206 |

OTHER PUBLICATIONS

"Monitoring and Debugging of Deployed Sensor Networks", M. Ringwald, K. Romer, Switzerland, 2005.*
"On the Need for Passive Monitoring in Sensor Networks", A. Awad et al, IEEE, 2008.*

* cited by examiner

*Primary Examiner* — Habte Mered
(74) *Attorney, Agent, or Firm* — Eduardo Krupnik; Miller Thomson LLP (57) ABSTRACT

A method of evaluating and diagnosing performance of an operating wireless sensor network without disturbing or burdening the network is disclosed. The operating wireless sensor network includes a plurality of operational nodes. A system, which comprises a plurality of detecting nodes and a performance evaluation and diagnosis platform, is provided in order to implement the present method. After time synchronization, the detecting node is connected with an operational node. After the detecting node estimates MAC or network layer address of its corresponding operational node, it will capture any transmission of or around the operational node, and upload captured packets to the evaluation and diagnosis platform. The evaluation and diagnosis platform produce a report by analyzing the acquired information from all detecting nodes.

22 Claims, 4 Drawing Sheets

FIG.6

PERFORMANCE MONITOR, EVALUATION AND DIAGNOSIS SYSTEM FOR WIRELESS SENSOR NETWORKS

FIELD OF THE INVENTION

The present invention relates generally to wireless sensor networks. More specifically, the present invention relates to a performance evaluation and diagnosis system for wireless sensor networks.

BACKGROUND OF THE INVENTION

A wireless sensor network (WSN) consists of a large number of low-cost, low-power sensor nodes, which can perform sensing, simple computation, and wireless communication over shod distance. With the increasing demand of applications, many new solutions for WSN have been proposed. Accurate evaluation for the performance of both new solutions and exist solutions is significant and necessary. So far, most of the evaluation is carried out by means of mathematical analysis or simulation. However, evaluation for the performance experimentally in a physical environment using real-life devices will be more convincing. However, a universal performance evaluation platform for WSNs does not exist.

U.S. Pat. No. 8,295,183 ("U.S. 183") discloses a method and system to monitor the status and behavior of a WSN. This system aims to monitor and influence the behavior and status of WSN, by means of the state messages sent wirelessly from the operational nodes to the monitoring nodes. A disadvantage of this system is that the operational node needs to be added with an additional function which is used to provide the state message to the monitor node. As such, the system of U.S. 183 is not a universal performance evaluation platform for WSN. In addition, send the state messages will cost extra power consumption of the operational nodes and communication resource (such as bandwidth and time) of the whole network. Moreover, adding of this additional function requires extra efforts from users or vendors of the operational WSNs which is monitored by this patented system. This inserted additional function could potentially influence or damage operation of their WSN. Therefore, this patent method and system have limited practicability and acceptance for most of WSNs, especially for existing WSNs.

U.S. Pat. No. 8,165,833 provides a system for evaluating a traffic performance in a tree type multi-hop wireless network of a CSMA/CA method. A major limitation of this patent is aimed for tree type multi-hop wireless networks with CSMA/CA access control method. Another limitation is that only traffic performance can be evaluated.

SUMMARY OF THE INVENTION

An exemplary object of the invention is to provide a wireless sensor networks ("WSN" or "WSNs") monitor system and to develop a method for monitoring the performance of a WSN having operational nodes.

The system according to an exemplary aspect of the invention is a monitor system, which includes one or more detecting nodes. Each detecting node includes (i) means for time synchronizing with other detecting nodes in the system; (ii) means for acquiring an identification of operational nodes of the WSN; (iii) means for capturing signals transmitted to and from the identified operational nodes of the WSN; and (iv) means for adding an identifier to the captured signals to form a recorded message. The system, in one embodiment, further includes (v) means for uploading the recorded message to a performance evaluation and diagnosis platform. The system, in another embodiment, includes the performance evaluation and diagnosis platform having, in one embodiment, (i) means for receiving the recorded messages from the one or more detecting nodes, and (ii) means for evaluating and/or diagnosing the performance of the WSN based on the recorded messages.

In another embodiment of the system, the means for capturing signals transmitted to and from the identified operational nodes of the WSN is an antenna.

In another embodiment of the system of the present invention, the one or more detecting nodes are linked to the at least one operational node through an RF connector to share an antenna.

In another embodiment of the system, the means for adding an identifier includes a time synchronization module.

In another embodiment of the system, the identifier includes one or more of a time reference, an address of the identified operational node or nodes, and a link quality field.

In another embodiment of the system of the present invention, the identification of the operational nodes is a MAC or network layer address.

In another embodiment of the system, the performance evaluation and diagnosis platform includes a recorded message input unit, a preprocess unit, a data storage unit, a performance evaluation unit, a diagnosis unit, an output unit, and display unit.

In another embodiment of she system, the performance evaluation and diagnosis platform includes: a recorded message input unit which is operated to receive recorded messages respectively from each detecting node, a preprocess unit which classifies and aggregates the input recorded messages, a data storage unit which stores the processed recorded messages input from the preprocessed unit, a performance evaluation unit having one or more sub-units having evaluating performance measurement means, a diagnosis unit which diagnoses and identify location of faults or causes for degraded performance, a display unit which snows results from both performance evaluation unit and diagnosis unit.

In another embodiment of the system of the present invention, means (i) to (iv) of the detecting nodes are automatic means.

In one embodiment, the present invention is a method of monitoring the performance of a WSN. The detecting node of the system of the present invention is capable of capturing any signal to and from an identified operational node on multi channels simultaneously. After successful time synchronization and the address acquirement, the detecting node captures any signal that they can detect to and from an identified operational node, compiles the captured signals into packets, and then encapsulates each packet into a recorded message by attaching one or more identifiers such as a node ID, a time stamp field, and a link quality field. The detecting node then uploads these recorded messages to an analyzer such as a performance evaluation and diagnosis platform of the system. The node ID field indicates the address of the detected operational wireless node, while the time stamp field and the link quality field respectively record time and link quality when the packet is received.

The method presented in this invention has capability of evaluating and diagnosing performance of an existing WSN without any interruption or adding any burden to the current WSN system. The method is operable on a computing device having a processor and memory. An exemplary embodiment of the method includes: (a) deploying one or more detecting nodes substantially proximal to the operational nodes, such that each detecting node captures signals to and from at least one corresponding operational node; (b) if two or more detecting nodes are deployed, time synchronizing the two or more detecting nodes; (c) each detecting node acquiring an identification of its corresponding at least one operational node; (d) the one or more detecting nodes capturing the signals to and from their identified at least one operational node; (e) adding to the captured signals one or more identifiers to form a recorded message; and (f) using the recorded messages to monitor the performance of the WSN system.

In one embodiment, the identifier includes one or more of a time stamp field, a node ID, and a link quality field.

In another embodiment of the method of the present invention, step (b) precedes step (a).

In another embodiment of the method of the present invention, the detecting nodes are communicatively connected to the operational node by RF connector.

In another embodiment of the method of the present invention, the method further includes the deployed detecting nodes acquiring an address of its corresponding operational node, and step (d) further includes adding the address to the recorded message.

In another embodiment the method of the present invention, step (f) includes, uploading the recorded message to an analyzer, such as a performance evaluation and diagnosis platform.

In another embodiment of the method of the present invention, the uploading is done to real time or after a pre-defined time period.

In another embodiment, the method of the present invention further includes arranging the operational nodes of the WSN based on the performance evaluation and diagnosis of the recorded messages.

In another embodiment, the method of the present invention further includes displaying the performance evaluation, the diagnosis or both the performance and diagnosis.

In another embodiment of the method of the present invention, one or more of the steps in the method is automatic.

In one embodiment of the method of the present invention, the performance includes any type of information of links or any end-to-end path (consists of several consecutive links) between a pair of the operational nodes, including BER (Bite Error Rate), PER (Packet Error Rate), PDR (Packet delivery Rate), and link quality. In another embodiment, the performance further includes any information of a WSN, including traffic throughput, latency, jitter in delay, traffic distribution, interference from other similar networks, and network topology.

In another embodiment of the method of the present invention, the diagnosis function stated includes indentified reasons of a link fault, path fault, operational node affected by interference, or the problems which degrade the performance of a WSN.

In another embodiment, the present invention provides for WSN detecting node. In one embodiment, the WSN detecting node includes: (a) means for time synchronization with one or more detecting nodes; (b) means for acquiring an identification of the operational node; (c) means for capturing signals to and from an identified operational node of the WSN; and (d) means for adding an identifier to the captured signal to form a recorded message.

In one embodiment of the WSN detecting node of the present invention, the means for adding an identifier includes means for adding a time reference to the signals.

In another embodiment of the WSN detecting node of the present invention, the means for adding an identifier includes means for adding the operational node's identification field to the signals.

In another embodiment of the WSN detecting node of the present invention, the means for adding an identifier includes means for adding a link quality field to the signals.

In another embodiment of the WSN detecting node of the present invention, the WSN detecting node further includes means for uploading the recorded message to an analyzer, such as a performance evaluation and diagnosis platform.

The above and other features, including various novel details of implementation and combination of elements, will be described in more detail with reference to the accompanying drawings and claims. It will be understood that the particular methods and systems described herein are shown by way of illustration only and not as limitations. As will be understood by those skilled in the art, the principles and features described herein may be employed in various and numerous embodiments without departing from the scope of the invention.

BRIEF DESCRIPTION OF THE DRAWINGS

The present invention together with its objectives and advantages will be understood by reading the following description in conjunction with the drawings, in which.

DESCRIPTION OF THE PREFERRED EMBODIMENT

Next, exemplary embodiments of the present invention are described in detail with reference to the drawings.

Definitions

In this specification and in the claim that follow, reference will be made to a number of terms that shall be defined to have the meanings below. All numerical designations, e.g., dimensions and weight, including ranges, are approximations that typically may be varied (+) or (−) by increments of 0.1, 1.0, or 10.0 as appropriate. All numerical designations may be understood as preceded by the term "about".

The singular form "a", "an", and "the" includes plural references unless the context clearly dictates otherwise.

The term "comprising" means any recited elements are necessarily included and other elements may optionally be included. "Consisting essentially of" means any recited elements are necessarily included, elements that would materially affect the basic and novel characteristics of the listed elements are excluded and other elements may optionally be included. "Consisting of" means that all elements other than those listed are excluded. Embodiments defined by each of these terms are within the scope of this invention.

"Analyzer" refers to a platform which can analyze recorded messages and produce a monitoring report, such as a performance evaluation and diagnosis report, by analyzing the provided recorded messages from detecting nodes. Analyzer includes the performance evaluation and diagnosis platform in FIG. 1 and FIG. 6.

"Monitoring" includes evaluating performance, diagnosing, or both evaluating the performance and diagnosing.

"Operational nodes" refer to sensor nodes deployed primarily to serve one or more operations or purposes, such as sensing a condition in the environment, agricultural monitoring, tracing goods, etc.

"Signals" refer to wireless messages, information or signals sent between operational nodes.

"Detecting nodes" refer to nodes deployed to monitor the performance of the operational nodes and are not necessarily deployed for the purposes of the network.

In this document the term "recorded message" refers to a packet having one or more identifiers such as a time stamp and an operational node ID, as explained herein bellow. The recorded message may also include a link quality.

Wireless Sensor Network Monitoring System

Figure 1:
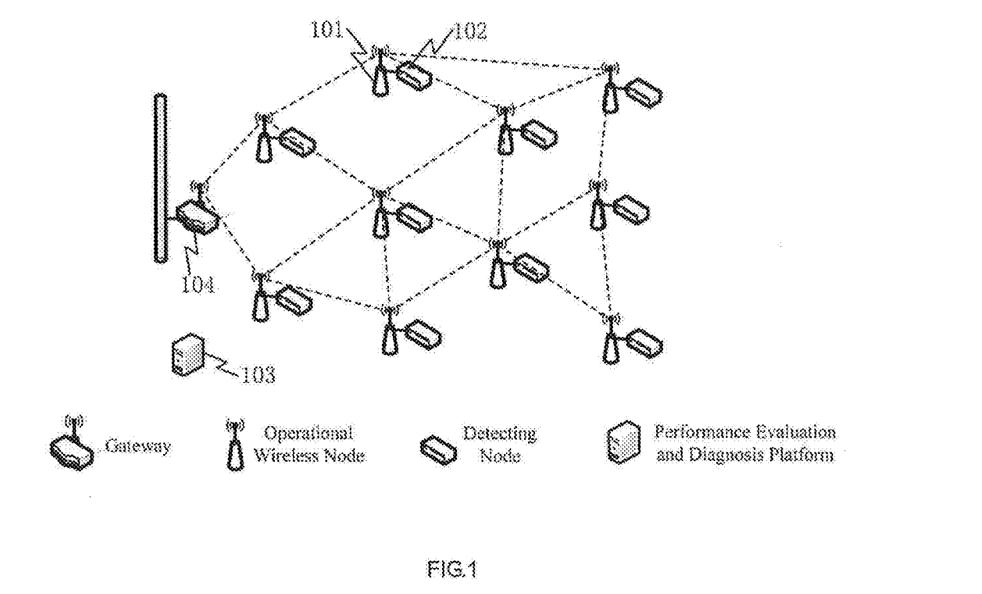
FIG. 1 is a diagram showing an exemplary deployment of performance evaluation and diagnosis system into a WSN according to one embodiment of the present invention.

With reference to FIG. 1, a typical wireless sensor network (WSN) usually includes some operational wireless nodes 101 and a gateway 104. The operational nodes 101 may be any operational wireless node and no additional function may be added to the operational node to provide information to the detecting node of the system of the present invention. As such, the detecting node of the present invention may be said to be a universal monitor or detecting node. FIG. 1 is a diagram showing an exemplary deployment of the monitor system of the present invention into a WSN. The performance evaluation and diagnosis system of the present invention may include one or more detecting nodes 102 and a performance evaluation and diagnosis platform 103. A general purpose computing device may be adapted for use as the performance evaluation and diagnosis platform. The detecting node 102 may be connected with the operational wireless node by RF T-style connector, or it may also be put nearby the operational wireless node 101. Distance between a deployed detecting node with its corresponding operational node may not have serious limitation. The closer the detecting node is placed to the operational node, the more accurate result may be obtained. Each operational wireless node 101 is suggested to be monitored by a detecting node 102. However, a detecting node 102 may also be shared by several operational wireless nodes 101.

Detecting Node

Figure 2:
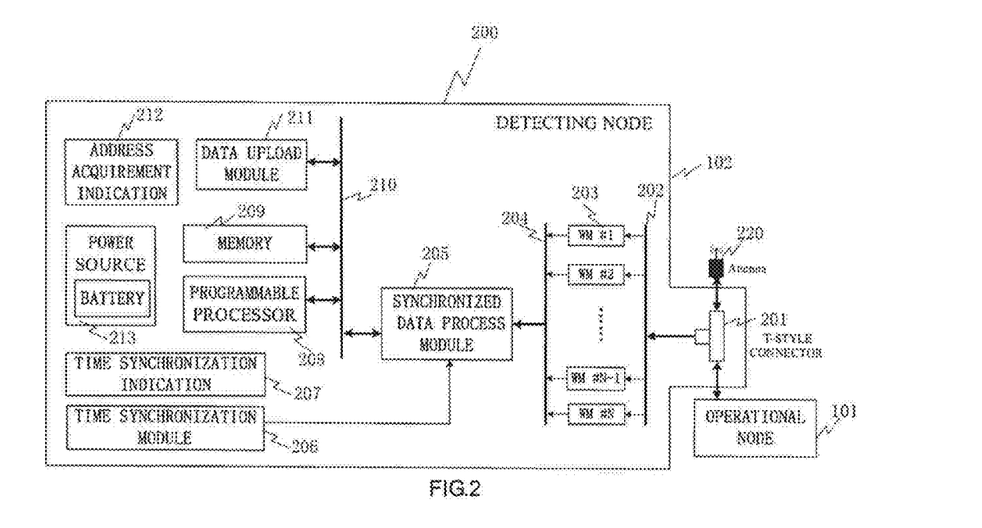
FIG. 2 is a schematic of a detecting node according to an exemplary embodiment of the present invention.

With reference to the items of FIG. 1, FIG. 2 is a block diagram of one embodiment of a detecting node 200. The detecting node 200 illustrated in FIG. 2 may be an embedded device, adapted for use as the detection node shown in FIG. 1. Referring to FIG. 2, each detecting node 200 may include such components as a means for connecting with the operational nodes 101 and receiving signals to and from the operational nodes 101, means for adding one or more identifier to the signals to form a recorded message, and means for uploading the recorded message to a performance evaluation and diagnosis platform, such as a data upload module 211. In the embodiment shown in the FIG. 2, the detecting node 200 is shown as including an RF bus 202, a plurality of wireless modules 203 (WMX, where x is from 1 to N), a packet bus 204, a synchronized data process module 205, a high precision time synchronization module 206, a time synchronization indication 207, a programmable processor 208, a memory module 209, a data bus 210, a data upload module 211, an address acquirement indication 212, a power source module 213.

The detecting node 102 may include an antenna and be disposed in close proximity to an operational node 101 of the WSN so as to detect the operational node 101. In another embodiment, the detecting node may be linked to operational node and share an antenna. The operational and detecting nodes may share the operational node antenna or the detecting node antenna. The operational node and the detecting node may, for example, be linked through an RF connector. FIG. 2 illustrates a T-style connector 201, however, it should be understood that other types may also be used, such as Y-style connector. In the embodiment illustrated in FIG. 2, the operational node 101 and the detecting node 200 share antenna 220. The RF connector 201 may be used to connect the antenna directly with the operational node 101. This RF connector 201 may have three terminals: one input terminal and two output terminals. Any wireless signals relevant to or around the operational node 101 may be captured as input into the detecting node 102. The use of a connector may be preferred since more accurate and detail information may be obtained. The captured wireless signals may then be sent into the plurality of wireless modules 203 simultaneously, for example via the RF bus 202. One embodiment of the wireless module 203 may be a single chip RF transceiver. The number of the wireless module may depend on how many channels of the WSN are required to be monitored at the same time. This plurality of wireless modules 203 may include a function block that scans wireless signal on different channels simultaneously, and convert or compile these signals into digital packets. The modules 203 may also add a link quality field to the digital packets. The packets and associated information may be transferred into the synchronized data process module 205 in parallel by the pocket bus 204. The synchronized data process module 205 may receive the packets, and add a time stamp which is synchronized by the time synchronization module 206. Either the programmable processor 208 or the synchronized data process module 205 may add the operational node ID to each packet. The module 205 may then store the recorded message (as defined herein below) into the memory module 209 under the guide of the programmable processor 208. The recorded message may be bundled and transferred to a data analyzer (e.g. the performance evaluation and diagnosis platform 103) via the data upload module 211. If the detecting node can communicate with the data analyzer directly, the module 205 may send the recorded message directly to the data analyzer via 211 and skip the memory module.

In one embodiment, the wireless module 203 is a RF single chip transceiver, such as CC2420 radio transceiver which can be used for detecting IEEE 802.15.4 complianced signals in the 2.4 GHz-band.

One embodiment of the synchronized data process module 205 may be an FPGA based implementation. Every wireless module 203 may be connected with the FPGA board separately.

The time synchronization module 206 may play an important role on the precision of the performance evaluation and diagnosis platform. Module 206 may periodically provide accurate time reference to the synchronized data process module 205, thus the synchronized data process module 205 can timestamp each input or output packets according to this time base. The time synchronization module 206 in a detecting node 200 should be time synchronized with the synchronization modules of other detecting nodes deployed with the system 100. One efficient way to implement this function may be to set up a time source, and the time synchronization module 206 in each detecting node 102 time synchronize with this time source so that each time synchronization module 206, in each detecting node 102 of system 100 is time synchronized with others (i.e. all of the detecting nodes in the system are time synchronized). An embodiment of the time synchronization module 206 may be a Global Positioning System (GPS) module, which can acquire accurate time wirelessly from GPS satellites. Another embodiment of the time synchronization module 206 may be an Ethernet module with the Network Time Protocol (NTP), which can acquire accurate time via wire. Major advantages of GPS module are higher accuracy in time, easier implement, and more convenient for deployment. An advantage of NTP based solution is lower cost. The GPS based solution may be preferred for detecting a WSN which is deployed in an environment without convenient Ethernet access or with large coverage area, and a WSN which has moving operational nodes.

Time synchronization indication 207 may be used to indicate that the time synchronization module 206 is successfully time synchronized with the other detecting nodes 102 of system 100. An embodiment of time synchronization indication 207 may be a LED or LCD display. Another embodiment may be a message sent via the data upload module 211.

A programmable processor 208 may be included to execute program instructions to guide the synchronized data process module 205 to directly store captured data into memory 209, to initiate data upload from memory 209 to a computer via data upload module 211, to initiate time synchronization module 206 for synchronized data process module 205, and to manage energy usage.

The memory module 209 may include any appropriate type of memory now known or later developed including without limitation, read-only memory (ROM), random access memory (RAM), flash memory, and a set of registers included within the programmable processor 208.

The data upload module 211 may be used to upload the recorded message from the detecting node 102 to the performance evaluation and diagnosis platform 103 shown in FIG. 1. One embodiment of the data upload module 211 may be a Wi-Fi module so that the data can be transferred wirelessly, and/or an Ethernet module for transmission by wire.

Address acquerment indication 212 may be used to indicate that the detecting node 102 has successfully acquired MAC or network layer address of its corresponding operational node 101. An embodiment of address acquerment indication 212 may be a LED or LCD display. Another embodiment may be a message sent via the data upload module 211.

In one embodiment, the power source 213 may include a battery. In other embodiments, the power source comprises, in addition to or instead of a battery, an interface for coupling the detecting node to an external power source such as a source of alternating current (AC) power.

Monitoring a WSN

Figure 3:
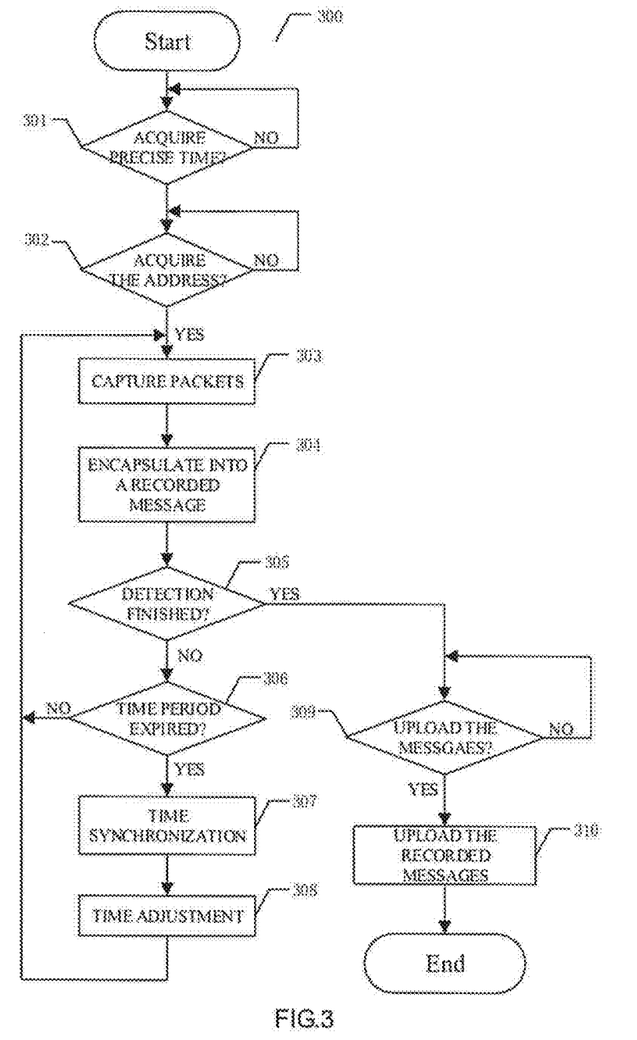
FIG. 3 is a flowchart showing an exemplary operation of the detecting node according to an exemplary embodiment of the present invention.

With continued reference to FIG. 1 and FIG. 2, FIG. 3 depicts an embodiment in which the example detecting node 102 may be configured to operate. The example process 300 of FIG. 3 may be implemented as machine-accessible instructions utilizing any of different programming codes stored on different parts of the detecting node 102. Further, although a particular order of actions is illustrated in FIG. 3, these actions may be performed in other temporal sequences. In the example of FIG. 3, the process 300 may begin with the detecting node 102 identifying whether it obtains a time reference (block 301) from its time synchronization module 206. If the detecting node 102 does not receive a time reference at block 301, the detecting node 102 may give a negative sign on the time synchronization indication 207, and continually stay at the block 301. If the detecting node 102 successfully receives a time reference at block 301, the detecting node 102 may give a positive sign on the time synchronization indication 207, and then determine whether it acquires an identification of its corresponding operational node 101 (it should be understood that it could be more than one corresponding operational nodes), such as a MAC layer or network layer address (block 302) of its corresponding operational node 101. If successfully obtained the address at block 302, the detecting node 102 may give a positive skin on the address acquerment indication 212, and then begin the operation of capturing signals to and from its operational node 101 at block 303, which may then be compiled into packets. Otherwise, if the detecting node 102 fails to acquire the address, the detecting node 102 may give a positive sign on the address acquerment indication 212 and continually stay at the block 302. An embodiment of method for a detecting node to acquire MAC or network layer address of its corresponding operational node may be to extract source address field of a packet whose value of received signal strength indication (RSSI) is higher than a predefined value. Once the detecting node 102 captures signals at block 303, it may then encapsulate the signals into captured packets and create a recorded message (block 304) by attaching reference information to the captured packets, which may include one or more of a node ID field, a time stamp when this packet is received, and a link quality field.

If the detecting node 102 fails to detect a completion command (block 305), the detecting node 102 may then determine whether a predefined time period has expired (block 306). If the time period has not expired, control may return back to block 303. Otherwise, if the time period has expired, the detecting node 102 may proceed to time synchronization (block 307) in order to update its time reference from the time synchronization module 206. The detecting node 102 may then calculate time shift error by, using its local time subtracts the received time reference, and adjust the time stamps (block 308) which may be added to the captured packets in the last period according to the time shift error to obtain the recording message.

If the detecting node 102 has successfully detected a completion command (block 305), the detecting node 102 may proceed to terminate the operation of capturing signals (303), and turn to a step for uploading the recorded message (block 309). Once the detecting node 102 detects the command, it may begin uploading its recorded messages to the performance analyzer 103. Otherwise, the detecting node 102 may remain in the stage of waiting for a command for uploading information (block 308). The command may be given by an operator or automatically after a pre-defined period of time.

Figure 4:
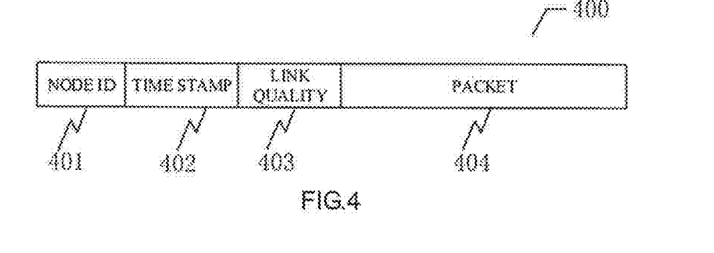
FIG. 4 shows an exemplary format for a recorded message sent by the detecting node to a performance evaluation and diagnosis platform.

FIG. 4 shows an exemplary format for a recorded message that may be created and sent by the detecting node to the platform 103. In the embodiment shown in FIG. 4, the recorded message includes a node ID field 401 that may include the address of the detected operational wireless node 101 corresponding to the detection node 102. Each recorded message may also include a time stamp field 402 and a link quality field 403 to respectively indicate the time and link quality when the packet was received. According to the IEEE 802.15.4 standard, two parameters can be used to evaluate quality of a link: Link quality indication (LQI) and received signal strength indicator (RSSI). The LQI function defined in IEEE 802.15.4 standard measures the received energy level and/or SNR for each received packet. RSSI is a measurement of the power present in a received radio signal. So, both the LQI and RSSI measurement can be used to evaluate the strength and/or quality of a received packet. Value of LQI and RSSI of a received packet can be automatically calculated at receiver side by an IEEE 802.15.4 compliance radio chip (e.g. CC2440, MC13224). So, the link quality field may include LQI and RSSI. Without a correct node ID field 401 and a time stamp field 402, the recorded message may be difficult to analyze. Each recorded message also includes a packet field 403 that contains the captured packet.

Figure 5:
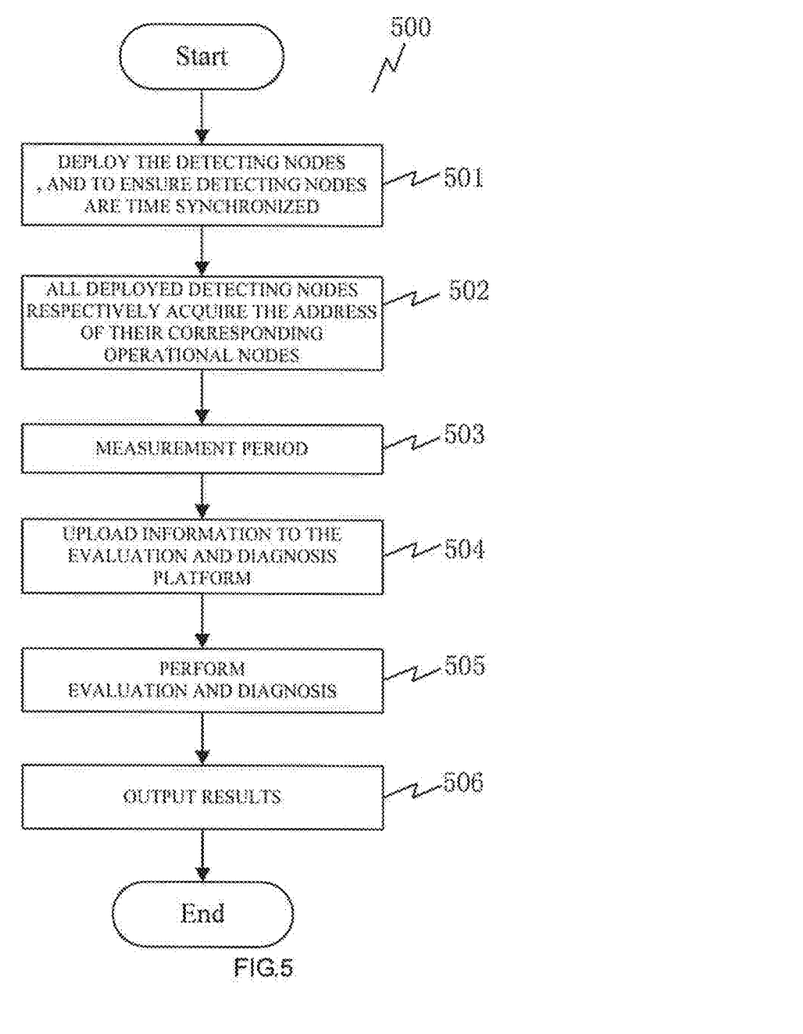
FIG. 5 is a flowchart showing a performance evaluation and diagnosis method for WSN according to the exemplary embodiment of the present invention.

With continued reference to FIG. 1 and FIG. 2, FIG. 5 is a flowchart of a performance evaluation and diagnosis method for the WSN in accordance to one embodiment of the present invention. The example process 500 of FIG. 5 may begin with block 501. At block 501, the power of all detecting nodes 102 shown in FIG. 1 may be turned on, deployed in the proximity of a corresponding operational node 101, and then time synchronization module 206 shown in FIG. 2 may be initialed automatically. Each detection node may then confirm that it has been successfully time synchronized by means of time synchronization indication before the pro ram goes to block 502. Timer in one of the detecting nodes or other resource (e.g. satellite) may be chosen as time reference, and the detecting nodes time synchronize separately with this reference so that all detecting nodes can be time synchronized with each others. The detecting nodes may be deployed before or after their time synchronizations with each others are confirmed.

At block 502, all deployed detecting node 102 may acquire MAC or network layer address of its corresponding operational node 101. Measurement period (block 503) may start once all deployed detecting node 102 have successfully acquired the address. Confirmation may be obtained by checking status of the address indication 212. During measurement period (block 503), all detecting nodes 102 may recode all captured packets with local time stamp when the packet is successfully received to produce the recorded message. Once the measurement period (block 503) is completed, all deployed detecting node may be initialed into a process of uploading the recorded messages (block 504) to the evaluation and diagnosis platform 103. At block 505, the evaluation and diagnosis platform 103 may receive the recorded messages respectively from each detecting node 102, and ten evaluate and/or diagnose performance by processing these provided messages, finally display the results (block 506).

Performance Evaluation and Diagnosis Platform

Figure 6:
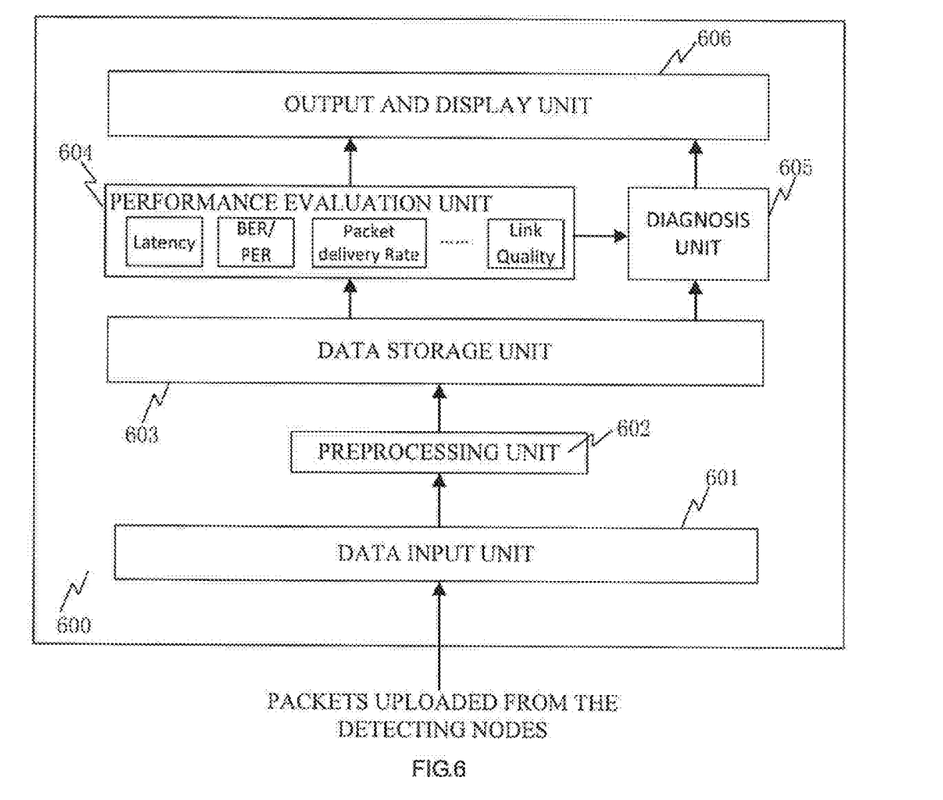
FIG. 6 is a function block diagram of software part of a performance evaluation and diagnosis platform according to the exemplary embodiment of the present invention.

FIG. 6 is a function block diagram of part of the performance evaluation and diagnosis platform according to an exemplary embodiment of the present invention. Referring to FIG. 6, the performance evaluation and diagnosis platform may be a personal computer or an embedded system having data input unit 601, preprocess unit 602, data storage unit 603, performance evaluation unit 604, diagnosis unit 605, output and display unit 606. The performance evaluation and diagnosis platform may produce a monitoring report, such as an evaluation and diagnosis report, by analyzing the information provided by one or more detecting nodes.

The input unit 601 may receive recorded messages (input information) respectively from each detecting node 102. The preprocess unit 602 may classify and aggregate the input information. The data storage unit 603 may store the processed input information from the preprocessed unit 602. The performance evaluation unit 604 may consist of one or more sub-units which are respectively responsible for evaluating one aspect of performance measurement. The performance evaluation unit 604 may contain BER evaluation sub-unit, PER evaluation sub-unit, link quality evaluation sub-unit, packet delivery latency evaluation sub-unit, link load evaluation sub-unit, etc.

With reference to FIG. 1, by comparing bites sent from an operational node 101 with bites received by another operational node 101 in a period, the BER evaluation sub-unit has capability of calculating BER between this pair of operational nodes 101. Similarly, the PER evaluation sub-unit can be used to evaluate PER between a pair of operational nodes 101. The packet delivery latency evaluation sub-unit may be used to measure time latency of a packet which is wirelessly delivered from source operational node 101 to destination operational node 101. This wireless delivery may contain a plurality of hops. The link load evaluation sub-unit can estimate transmission burden of each link during a certain time period.

The diagnosis unit 605 may receive input from both data storage unit 603 and performance evaluation unit 604, and then can diagnose and identify location of any faults or degraded performance. The output and display unit 606 outputs results from both performance evaluation unit 604 and diagnosis unit 605. The output may be any suitable output, such as a report that may be display on a screen or printed or sent to another device.

The performance stated in this invention can be any type of information of links between a pair of the operational nodes within a WSN, which may include BER, PER, PDR, and link quality. In an embodiment, as to a link between a pair of the operational nodes, two detecting nodes are deployed respectively for each operational node. The deployed detecting nodes may capture any signal, to and from an operational node, and upload captured packets (in the form of recorded messages) to the evaluation and diagnosis platform. Therefore, this platform can compare the sent packets with the received packets, and then calculate BER, PER, PDR of this link. In addition, link quality of a link may also be estimated by link quality identifiers inserted in recorded messages provided by the detecting node. The performance stated in this invention may also be any type of information of any end-to-end path (consists of several consecutive links) within a WSN, which may include BER, PER, PDR, latency of packet delivery, and time delay of packet relay. In an embodiment of evaluating performance of an end-to-end path between a pair of the operational nodes, several detecting nodes are deployed respectively for each operational node on this end-to-end path. The deployed detecting nodes may capture any signal to and/or from an operational node, and upload captured packets to the evaluation and diagnosis platform. Since this platform can calculate BER, PER, PDR of each fink of this path, it can also determine BER, PER, PDR of this path. In an embodiment of evaluating latency of packet delivery on an end-to-end path, as presented in this invention, each packet captured by the detecting node is added with a time stamp field to indicate the time when this packet is sent out or received. For a packet transmission over an end-to-end path, it is sent out from the source node to the destination node through relay nodes on this path. At the source side, sending time of the packet is inserted into a corresponding recorded message; while at the destination side, receiving time of the packet is also inserted into a corresponding recorded message. With these two recorded messages, latency of packet delivery may be achieved by using the receiving time subtracts the receiving time. In an embodiment of evaluating time delay of packet relay at a relay node on an end-to-end path, receiving time and relaying time of a packet are also inserted into the corresponding recorded messages, so time delay of this packet relay may also be calculated by using the relaying time subtracts the receiving time. Thus, time delay of packet relay at each relay node on an end-to-end path can be achieved if a corresponding detecting node is deployed.

The performance stated in this invention can also be any information of a WSN, which may include traffic throughput, traffic distribution, topology, and interference from other similar networks. It is assumed that one detecting node is deployed respectively for each operational node of a WSN. Each detecting node records every packet around its corresponding operational node as the recorded messages, and then uploads these recorded messages to the performance evaluation and diagnosis platform. With these messages from each detecting node, the platform can count traffic throughout of the entire network or a link, traffic distribution on every end-to-end path. In an embodiment, a WSN may be an IEEE 802.15.4 based WSN. In this kind of network, the destination address and source address are required to be contained in every packet for delivery. The performance evaluation and diagnosis platform can acquire communication relationship among the operational nodes by using the destination address and source address in every packet, thus can know topology of the WSN. Similarly, a PAN (Personal Area Network) ID is also required to be inserted into every packet for identification in an IEEE 802.15.4 based WSN. If a monitored IEEE 802.15.4 based WSN coexists with other IEEE 802.15.4 based WSNs, since each detecting node captures every packet not only from the monitored network but also from other networks, the platform can identify packets from other networks by means of the inserted PAN ID. These packets from other networks can be regarded as interference to the monitored network.

The diagnosis function stated this invention may include indentifying reasons of a link fault, path fault, or which operational node effected by interference. In an embodiment of diagnosing a link fault, if a link between a pair of the operational nodes failed, the diagnosis function within the performance evaluation and diagnosis platform could analyze the collected information, and then indentify probable causes for this failure. More specifically, if the detecting node at the transmitter side can capture packets from the transmitter, but the detecting node at the receiver side cannot get these packets any more, the diagnosis function may check if there are interferences during this time period. If yes, the cause for this link fault may be identified as interferences. If no, a probable cause for this link failure may be that communication path of this link is interrupted. In an embodiment of diagnosing a path fault, if an end-to-end path between a pair of the operational nodes cannot work any- more, the diagnosis function within the performance evaluation and diagnosis platform could analyze links on this path one by one, so that can identify which link's fault causes the path failure.

This present invention has many advantages which include the following four significant aspects. Firstly, no additional burden is put on to a WSN. In other words, no additional function is needed to be added into nodes of a WSN. Secondly, after the present system is deployed, it has no effect or potential interference to its monitored WSN. The monitored WSN can work in its original mode, without knowing existence of the present system. Thirdly, this present system can be used for any kind of WSN with no limitation on the network topology (e.g. star, tree, mesh, and cluster). Last but not least, by using this present system and method, not only performance of a WSN can be monitored and evaluated, but also some faults within a WSN can be identified.

The subject matter has been described with reference to particular embodiments. However, it will be readily apparent to those skilled in the art that it is possible other embodiments of described above. Nevertheless, it will be understood that various modifications to the described embodiments may be made without departing from the spirit and scope of the claimed invention. Accordingly, the scope of the invention shoo be determined by the following claims and their legal equivalents.

What is claimed is:

1. A passive monitor system for a wireless sensor network (WSN) which includes one or more operational nodes, the passive monitor system comprising: one or more detecting nodes, each detecting node including (i) means for time synchronizing with other detecting nodes in the monitor system; (ii) connector for physically connecting to at least one operational node of the WSN, the connector for physically connecting being a radio frequency (RF) connector, the RF connector including (a) an output terminal connected to the detecting node, (b) an output terminal for physically connecting to the at least one operational node and (c) an input terminal connected to an antenna of the physically connected operational node to share the physically connected operational node's antenna; (iii) means for independently and automatically acquiring an identification of the at least one physically connected operational node of the WSN to identify the at least one physically connected operational node; (iv) means for only capturing wireless messages, information or signals sent between the physically connected identified operational node and other operation nodes of the WSN; and (v) means for adding an identifier to the captured wireless messages, information or signals to form a recorded message.

2. The system of claim 1, wherein the system further comprises a performance evaluation and diagnosis platform having (i) means for receiving the recorded messages from the one or more detecting nodes; and (ii) means for evaluating the performance and diagnosis of the WSN based on the recorded messages.

3. The system of claim 2, wherein each detecting node further includes (v) means for uploading the recorded message to the performance evaluation and diagnosis platform.

4. The system of claim 2, wherein said performance evaluation and diagnosis platform includes a recorded message input unit, a preprocess unit, a data storage unit, a performance evaluation unit, a diagnosis unit, and an output unit.

5. The system of claim 2, wherein said performance evaluation and diagnosis platform includes: a recorded message input unit which is operated to receive recorded messages respectively from each detecting node, a preprocess unit which classifies and aggregates the input recorded messages, a data storage unit which stores the processed recorded messages input from the preprocessed unit, a performance evaluation unit having one or more sub-units having evaluating performance measurement means, a diagnosis unit which diagnoses and identify location of faults or causes for degraded performance, a display unit which shows results from both performance evaluation unit and diagnosis unit.

6. The system of claim 1, wherein the detecting node includes a programmable processor, the programmable processor including instructions for implementing said means for only capturing information transmitted to and from the at least one identified operational node of the WSN after acquiring the address of the address of the at least one physically connected operational node.

7. The system of claim 1, wherein said means for adding an identifier includes a time synchronization module for adding a time reference to the captured information.

8. The system of claim 1, wherein said identifier includes one or more of an address of the identified operational nodes, a time reference and a link quality field.

9. The system of claim 1, wherein the identification of the operational nodes is a MAC or network layer address.

10. The system of claim 1, wherein the means (i), (iii), and (iv) of the detecting node are automatic means and the connector is an automatic connector.

11. A passive method of monitoring the performance of a wireless sensor network (WSN) of operational nodes, said method operable on a computing device having a processor and memory, and comprising:
(a) physically connecting a detecting node to at least one of the operational nodes with a radio frequency (RF) connector, the RF connector including (i) an output terminal connected to one detecting node, (ii) an output terminal for physically connecting to the operational node and (iii) an input terminal connected to an antenna of the physically connected operational node to share the physically connected operational node's antenna with the physically connected detecting node;
(b) if two or more detecting nodes are physically connected, time synchronizing the two or more detecting nodes;
(c) each detecting node independently and automatically acquiring an identification of its physically connected at least one operational node;
(d) each detecting node capturing only the wireless messages, information or signals transmitted between its physically connected identified operational node and other operational nodes of the WSN;
(e) adding to the captured wireless messages, information or signals one or more identifiers to form a recorded message; and
(f) using the recorded message to monitor the performance of the WSN system.

12. The method of claim 11, wherein the identifier includes one or more of a time reference, a node identification field and a link quality field to the recorded message.

13. The method of claim 11, wherein the method further comprises each detecting node independently and automatically acquiring an address of the physically connected operational node, and wherein step (d) further includes adding said address to the recorded message.

14. The method of claim 11, wherein step (f) comprises uploading the recorded message to a performance evaluation and diagnosis platform.

15. The method of claim 14, wherein said uploading is done in real time or after a pre-defined time period.

16. The method of claim 14, wherein the method further includes arranging the operational nodes of the WSN based on the performance evaluation and diagnosis of the recorded messages.

17. The method of claim 11, wherein one or more of the steps in the method is automatic.

18. A WSN (wireless sensor network) detecting node comprising: (a) a radio frequency (RF) connector for physically connecting to an operational node, the RF connector including (i) an output terminal connected to the detecting node, (ii) an output terminal for physically connecting the WSN detecting node to the operational node and (iii) an input terminal connected to an antenna of the physically connected operational node to share the physically connected operational node's antenna; (b) means for time synchronization with one or more detecting nodes; (c) means for independently and automatically acquiring an identification of the physically connected operational node (d) means for only capturing wireless messages, information or signals sent between the physically connected identified operational node and other operational nodes of the WSN, and (e) means for adding an identifier to the captured wireless messages, information or signals to form a recorded message.

19. The WSN detecting node of claim 18, wherein the means for adding an identifier includes means for adding a time reference to the signals.

20. The WSN detecting node of claim 18, wherein the means for adding an identifier includes means for adding the operational node's identification field to the signals.

21. The WSN detecting node of claim 18, wherein the means for adding an identifier includes means for adding a link quality field to the signals.

22. The WSN detecting node of claim 18, wherein the WSN detecting node further includes means for uploading the recorded message to an analyzer.

* * * * *